United States Patent
Ismail et al.

(10) Patent No.: US 9,325,433 B2
(45) Date of Patent: Apr. 26, 2016

(54) HIGH DYNAMIC RANGE TRANSCEIVER

(71) Applicant: Ultrawave Labs, Inc., Garden Grove, CA (US)

(72) Inventors: Aly Mamdouh Ismail, Irvine, CA (US); Francis Carr, Newport Coast, CA (US); Sai Kwok, San Diego, CA (US)

(73) Assignee: ULTRAWAVE LABS, INC., Irvine, CA (US)

( * ) Notice: Subject to any disclaimer, the term of this patent is extended or adjusted under 35 U.S.C. 154(b) by 133 days.

(21) Appl. No.: 14/082,504

(22) Filed: Nov. 18, 2013

(65) Prior Publication Data

US 2014/0072072 A1  Mar. 13, 2014

Related U.S. Application Data

(63) Continuation of application No. 13/022,538, filed on Feb. 7, 2011, now abandoned.

(60) Provisional application No. 61/337,692, filed on Feb. 6, 2010.

(51) Int. Cl.
*H04B 15/00* (2006.01)
*H04L 27/02* (2006.01)
*H04B 1/525* (2015.01)

(52) U.S. Cl.
CPC .............. *H04B 15/00* (2013.01); *H04B 1/525* (2013.01); *H04L 27/02* (2013.01)

(58) Field of Classification Search
CPC .......... H04B 15/00; H04B 1/525; H04L 27/02
USPC .................................................. 375/269, 285
See application file for complete search history.

(56) References Cited

U.S. PATENT DOCUMENTS

| | | | |
|---|---|---|---|
| 2008/0041953 A1* | 2/2008 | Frederick | H04B 1/525 235/451 |
| 2008/0219377 A1* | 9/2008 | Nisbet | 375/296 |

* cited by examiner

*Primary Examiner* — Timothy A Brainard

(57) ABSTRACT

This invention uses one or more cancellation modules to eliminate the transmitter leakage at the output of the receive antenna and prior the receiver circuitry so that the received signals can be analyzed without degradation in quality due to simultaneous operation of the transmitter and receiver. Each cancellation circuit could be limited to only 30-50 dB of rejection due to component mismatches and other circuit non-idealities. To obtain further cancellation, more than one cancellation circuit can be applied after the first low noise amplifier. The output of the low noise amplifier can be repeatedly mixed with additional cancellation signals "n" number of times such that the "n" low noise amplifier is mixed with the "$n^{th}$" cancellation signal. For each additional cancellation signal added a 20-30 dB reduction in noise may be achieved such that cascading three or four cancellation signals from cancellation modules may produce a 150 dB gain.

17 Claims, 8 Drawing Sheets

HIGH DYNAMIC RANGE TRANSCEIVER

CLAIM OF PRIORITY AND CROSS REFERENCE TO RELATED APPLICATION

This application claims the benefit of U.S. Patent Application No. 61/337,692 filed on Feb. 6, 2010, titled "High Dynamic Range, Short Range Radar" and U.S. patent application Ser. No. 13/022,538 filed on Feb. 7, 2011 both of which are incorporated by reference in their entirety.

BACKGROUND OF THE INVENTION

1. Field of Invention

This invention relates generally to wireless communication systems. Specifically, the invention relates to a cancellation system for use with wireless communication systems.

2. Related Art

Current communication systems usually support multi-mode wireless communication standards where the mobile device may operate and exist with a small form factor. Specifically, with the wide variety of communications standards that modern wireless systems are required to comply with, interference between the various wireless systems or subsystems can be a true design challenge. Unlike the case of a single isolated wireless system, where possible interference between the transmitter and receiver can be handled by the use of different frequencies or different time slots, the co-existence of more than one system in close proximity can make the interference problem much more severe. In this case where more than one transmitter operate at the same frequency and same time slot, a receiver will detect undesired interference, which could overwhelm the desired signal and cause significant degradation in the quality of the received signal.

Moreover, the distance between the various antenna becomes a critical issue in such a complex communication environment where a number of transmitter and receiver systems are required to co-exist. In some cases, where the antenna are located in the Fresnel near-field region, that may result in constructive and destructive signal combining that may produce a large tone that would overpower the smaller reflected signal from the target. For example, assuming the simple case of a large transmitted tone to co-exist with the received signal at the same (or close to) frequency and time slot of the received signal. In practice, the desired received signal may be as low as 90 dB to 130 dB below the large tone. This result would effectively put the reflected signal level below the noise floor of most spectrum analyzers due to compression as well as the transmitter noise spectrum, which typically at best have approximately 60 dB of dynamic range (where dynamic range is generally defined as the difference between the highest and lowest power signals that the spectrum analyzer can simultaneously measure).

Typically, the magnitude of this large tone may be decreased by spacing the adjacent antennas farther apart; however, in many applications, space is premium such that the antenna cannot be spaced farther apart. This issue with simultaneous transmit and receiving problem is the same fundamental limit that forces majority of communication systems to operate as a "half-duplex" system, i.e. as only a transmitter or receiver at any point in time. Unless the frequency bands of the transmit signal and receiver signal are separated with enough margin to allow for a duplexer filter to be used, a physical realization of a "full-duplex" transceiver system is very difficult to realize. That is mainly due to the difficulty of receiving weak signals into a receiver in the existence of a strong interferer coming from the strong transmitted signal from the same system or another adjacent transmitter system that can be in proximity.

As an example of these problems in FIG. 1, a block diagram of an example of an implementation of a wireless transceiver 100 for use with a communication system is shown. The transceiver system 100 may include a first antenna 102, a second antenna 104, a transmitter 106, a receiver 108, a first frequency source 110, and a second frequency source 112. The transmitter 106 may be in signal communication with both the first antenna 102 and first frequency source 110 via signal paths 114 and 116, respectively. Similarly, the receiver 108 may be in signal communication with both the second antenna 104 and second frequency source 112 via signal paths 118 and 120, respectively. Additionally, the first antenna 102 may be in signal communication with the second antenna 104 via signal paths 122.

In an example of operation, the transmitter 106 receives a frequency reference signal 124 from the first frequency source 110 via signal path 116. The transmitter 106 then transmits a transmit signal 126 through the first antenna 102 which becomes signal 128. The signal 130 is the transmitter leakage that directly couples to the second antenna 104 via signal path 122.

The second antenna 104 receives the first portion 130 of the transmit signal 126 as well as the received signal 132 and passes the combined received signal 134 to the receiver 108, via signal path 118, which produces an receiver output signal 136.

In FIG. 2, an example plot of the amplitude 200 versus frequency 202 of the receiver output signal 200 produced by the transceiver system 100 of FIG. 1 is shown. The receiver output signal 204 may include transmitter leakage 206 at frequency $F_0$ 208 (which would be the local oscillator frequency of the first frequency source 110) and a secondary tone at frequency $F_1$.

The transmitter leakage 206 is caused by the direct coupling from the transmit antenna to the receive antenna as shown in FIG. 1. The difference in amplitude intensity between the transmit leakage 206 and the received signal 210 is shown as A 214. As an example, the difference between the transmitter leakage 206 and the received signal 210 may be as much as 90 to 130 dB which effectively places the received signals 210 below the noise floor coming from the transmitted signal. Additionally, because of jitter effects caused by the characteristics of the frequency source and the relatively small frequency and time difference between the transmitter leakage 206 and the received signal 210, the transmitter leakage 206 may have a skirt 216 that effectively covers the received signal 210 and will, hence, make it impossible to recover the desired signal. As such, there is a need for a methodology to extend the dynamic range of transceiver system that overcomes the above mentioned problems.

SUMMARY

This invention transmits radio frequency energy that is also capable of receiving radio frequency energy and can eliminate the transmitter leakage by performing at least one cancellation process to improve the gain. An amplitude phase shift module and at least one power and phase detector modules are used to detect the reflected RF energy signals while acting to eliminate the transmitter leakage and received signals.

This invention may use a one or more cancellation modules to eliminate the transmitter leakage so that the received signals are analyzed. Each cancellation circuit could be limited to only 20-50 dB of rejection due to component mismatches and other circuit non-idealities. To obtain further cancellation, another cancellation circuit can be applied after the first low noise amplifier. The output of the low noise amplifier can be repeatedly mixed with additional cancellation signals "n" number of times such that the "n" low noise amplifier is mixed with the "$n^{th}$" cancellation signal. For each additional cancellation signal added a 20-50 dB reduction in noise may be achieved such that cascading three or four cancellation signals from cancellation modules may produce a 150 dB gain.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
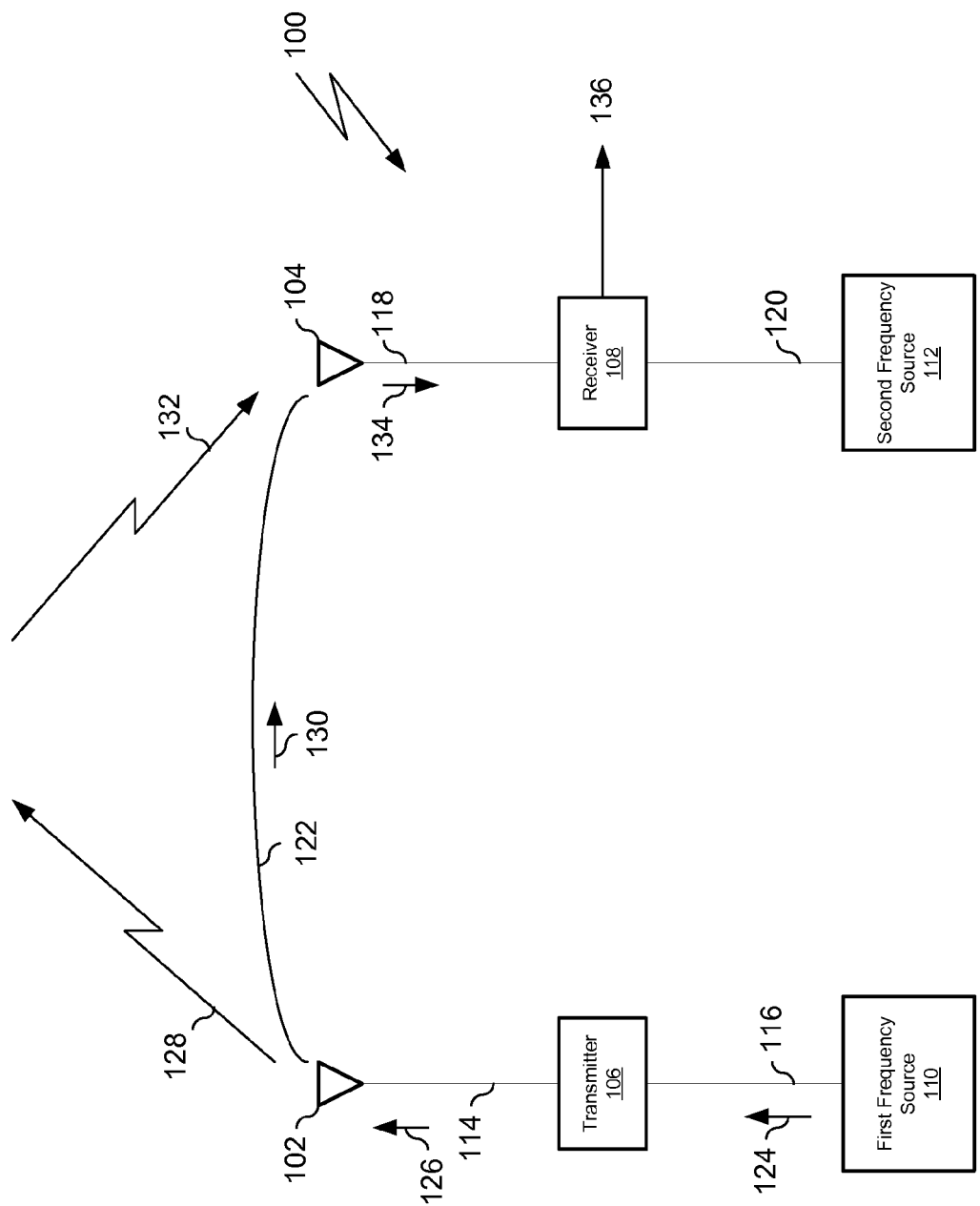
FIG. 1 is a prior art diagram of a transceiver system for use in a communication system.
Figure 2:
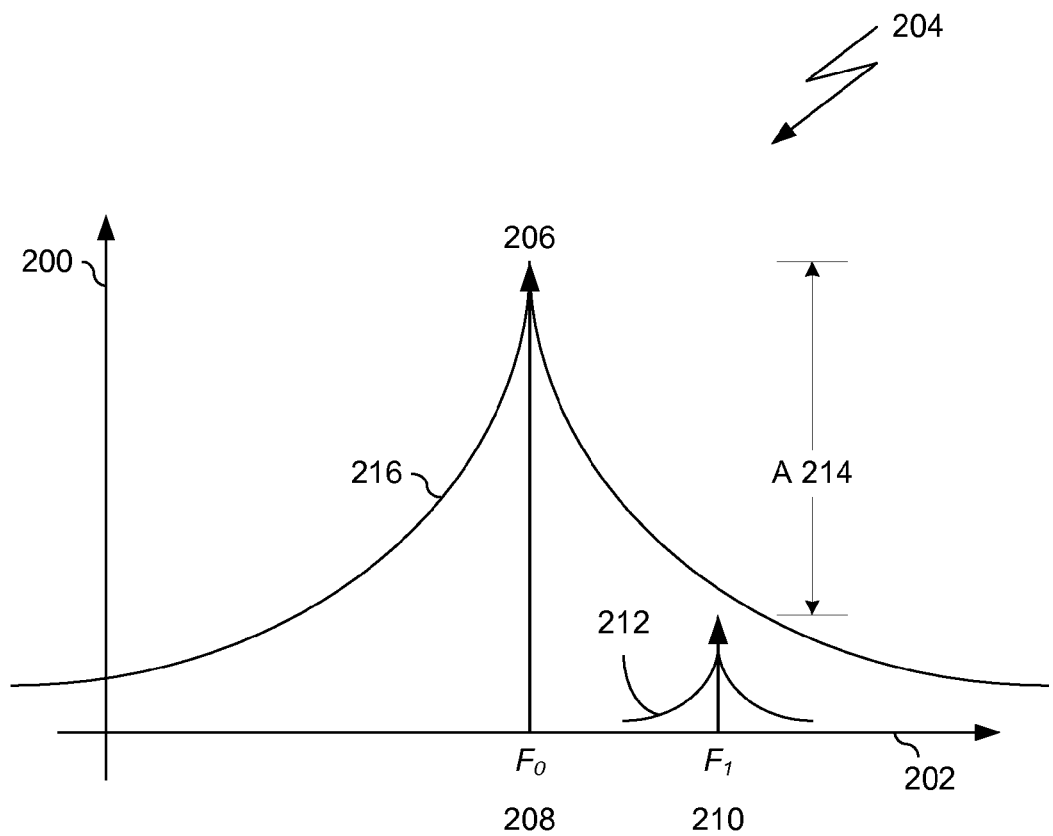
FIG. 2 is a prior art plot of a receiver output signal produced by the wireless transceiver system shown in FIG. 1.
Figure 3:
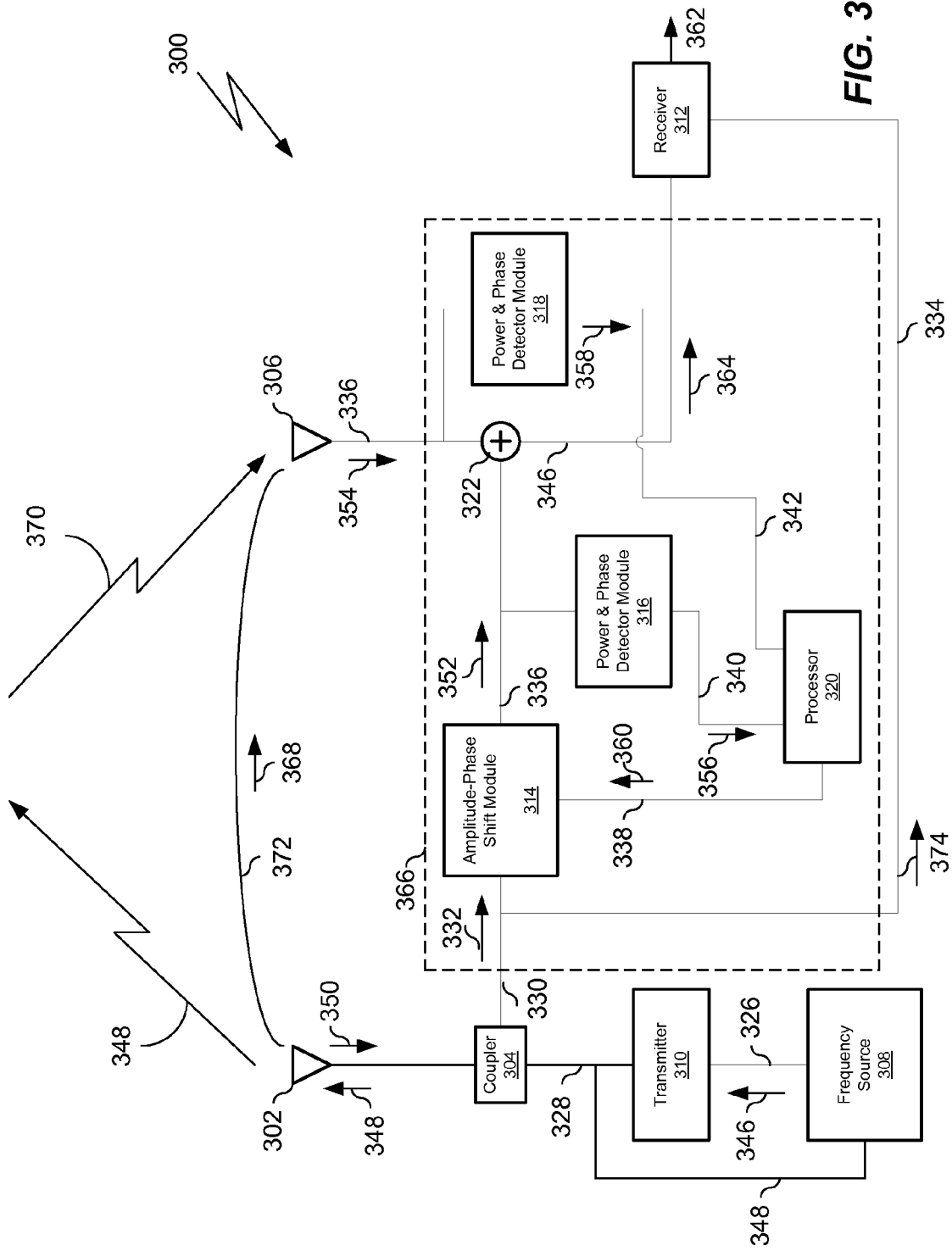
FIG. 3 is a block diagram of an example of an implementation of the wireless transceiver system.

The circuits, components, modules, and/or devices of the high dynamic range transceiver system 300 shown in FIG. 3 are described in signal communication with each other, where the signal communication refers to any type of communication and/or connection between the circuits, components, modules, and/or devices that allows a circuit, component, module, and/or device to pass and/or receive signals and/or information from another circuit, component, module, and/or device.

The communication and/or connection may be along any signal path between the circuits, components, modules, and/ or devices that allows signals and/or information to pass from one circuit, component, module, and/or device to another and includes wireless or wired signal paths. The signal paths may be physical pathways such as, for example, conductive wires, electromagnetic wave guides, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

In FIG. 3, a block diagram of an example of an implementation of a transceiver system 300 is shown. The transceiver system 300 includes a first antenna 302, a coupler 304, a second antenna 306, a frequency source 308, a transmitter 310, a receiver 312, an amplitude-phase shift module 314, a first power and phase detector module 316, a second power and phase detector module 318, a processor 320, and a combiner 322. The first antenna 302 and second antenna 306 may are capable of transmitting and receiving RF energy of the electromagnetic spectrum.

The first antenna 302 may be connected to a coupler 304 via path 324. The transmitter 310 and the frequency source 308 may be connected via signal path 326. The coupler 304 may be connected to the transmitter 310 via signal path 328. The frequency source 308 may be an oscillator, a temperature controlled oscillator or any other type of frequency generating device. The signal path 328 may also be in signal communication along path 330 such that the bleeded signal 332 is sent to the amplitude-phase shift module 314. The frequency source 308 generates signals to the transmitter 310 and may also be in signal communication with the receiver 312 via signal path 334. The amplitude-phase shift module 314 may be in signal communication with the first power and phase detector module 316 and combiner 322 via signal path 336; and in signal communication with the processor 320 via signal path 338.

The processor 320 also may be in signal communication with the first power and phase detector module 316 via signal path 340; and in signal communication with the second power and phase detector module 318 via signal path 342. The second antenna 306 may be in signal communication with both the second power and phase detector module 318 and the combiner 322 via signal path 336. The combiner 322 may be in signal communication with the receiver 312 via signal path 346. Additionally, the first antenna 302 may be in signal communication with the second antenna 306 via signals 368 and 370.

As an example, the first antenna 302 and second antenna 306 may both be RF energy antennas. The frequency reference signal 346 from the frequency source 308, via signal path 326 sent to the transmitter 310, may be used to upconvert and/or modulate a transmit signal 348 that is passed to the first antenna 302 via signal path 324 and a bleeded signal 332 is sent to the amplitude phase shift module 314. In the alternative, the frequency source 308 may generate a signal sent along path 348 bypassing the transmitter 310 and sending the signal along path 348 to the coupler 304. If a first received signal 350 arrives at the first antenna 302, a coupler 304 acts to isolate the received signal 350 so that it is not passed to the transmitter 310 or to the amplitude phase shift module 314.

Receiver 312 is a circuit, component, module, and/or device capable of receiving RF energy signals through the second antenna 306 and combiner 322. The receiver 312 includes at least one mixer (not shown) that utilizes the bleeded signal 332 from the coupler 304 allowing the receiver 312 to subtract out the phase noise added by the transmitter 310, frequency source 308 or both.

An optional path is for the frequency source 308 to output a signal directly to the receiver 312. Although this optional path would not remove the phase noise generated by the transmitter 310. It is appreciated that while only a receiver is shown in FIG. 3 as receiver 312, the scope of the invention could include utilizing a second transmit/receive module instead of only a receiver.

The frequency source 308 is a circuit, component, module, and/or device capable of producing the frequency reference signal 346. The frequency source 308 may be, for example, a local oscillator or frequency synthesizer both of which are well known by those skilled in the art. The frequency source 308 may include, for example, a voltage controlled oscillator, temperature controlled oscillator, or voltage and temperature controlled oscillator.

Each of the first power and phase detector module 316 and second power and phase detector module 318 may be a circuit, component, module, and/or device capable of detecting the power amplitude and/or the phase of an amplitude phase shift module output signal 352 from the amplitude phase shift module 314 and a second received signal 354 from the second antenna 306. Both the first power and phase detector module 316 and the second power and phase detector module 318 may include one or more power detector sensor circuits and/or phase detector sensor circuits.

In an example operation, the first power and phase detector module 316 would produce a first power and phase detector module signal 356 in response to detecting the power and/or phase of the amplitude phase shift module output signal 352. The first power and phase detector module 316 may send to the processor analog or digital data on the amplitude and phase of the amplitude phase shift module output signal 352. If analog data is sent an analog-digital converter is needed before the signal is passed to the processor 320.

Similarly, the second power and phase detector module 318 produces a second power and phase detector module signal 356 in response to detecting the power and/or phase of the second received signal 354. The first power and phase detector module signal 356 may send to the processor analog or digital data on the amplitude and phase of the received signal 354 and second power and phase detector module signal 356 would then include measured power and/or phase information data passed to the processor 320 via signal paths 340 and 342, respectively. If analog data is sent an analog-digital converter is needed before the signal is passed to the processor 320.

The processor 320 is a circuit, component, module, and/or device capable of receiving the first power and phase detector module signal 356 and second power and phase detector module signal 358 and, in response, generate an amplitude phase shift module control signal 360 that would control the amplitude-phase shift module 314 via signal path 338. The processor 320 is capable of determining how to modify the amplitude and/or phase of the transmit signal 352 with the amplitude phase shift module 314 in order to increase resolution and dynamic range of the receiver output signal 362 based on the measured power and/or phase information data provided by the first power and phase detector module signal 356 and second power and phase detector module signal 358. The processor 320 may be, for example, a central processing unit ("CPU"), microprocessor, microcontroller, controller, digital signal processor ("DSP"), reduced instruction set processor ("RISC processor"), application specific integrated circuit ("ASIC"), or other similar types of devices.

The amplitude-phase shift module 314 is a circuit, component, module, and/or device capable of receiving the amplitude phase shift module control signal 360 and, in response, adjusting the transmit signal 332 in amplitude, phase, or both, to produce the amplitude phase shift module output signal 352 which is passed to the combiner 322 via signal path 336. The combiner 322 may be a circuit, component, module, and/or device capable of combining the amplitude phase shift module output signal 352 with the second received signal 354 to produce the receiver input signal 364. The combiner 322 may be, for example, a summation circuit or coupler.

This sampling and routing of signals acts to cancel via cancellation circuitry 366 the transmitter leakage of received signals 368 and signal 370. Thus, the system is designed to cancel the transmitter leakage from signal 368 leaving only the received signals 370. It is this modified signal 364 that is passed to the receiver 312 and then onto the communication system via signal path 362 for output to a user.

The transceiver system 300 produces the RF energy when the frequency transmit signals 348 are generated. The input signal 332 may be externally generated, preprogrammed or generated by the transmitter 310. The output signal 348 is passed to the first antenna 302 via signal path 328. The first antenna 302 transmits the transmit output signal 348 towards the medium of the communication channel, which could be air. A portion 368 of the transmitted output signal 348 may be directly coupled to the second antenna 306 via signal path 372.

A portion 332 of the transmitted output signal 348 captured via a coupler 304 or any similar device is fed to the cancellation system, where its amplitude and phase are going to be adjusted to accurately perform cancellation. Ideally, the coupler 304 acts to allow transmission of output signals, but does not pass received signals 350 to other circuitry such as the amplitude phase shift module 314.

Based on the amplitude phase shift module control input signal 360, the amplitude-phase shift module 314 adjusts the received transmit signal 332 in phase and/or amplitude to produce the amplitude phase shift module output signal 352, which is passed to the first power and phase detector module 316 and combiner 322. The first power and phase detector module 316 samples part of the amplitude phase shift module output signal 352 and measures the power amplitude and/or phase of the amplitude phase shift module output signal 352 and sends the measured information to the processor 320 via the first power and phase detector module signal 356 along signal path 340.

The second antenna 306 receives the leakage signal 368 of the transmitted output signal 348 and passes the combined received signal 360 to both the second power and phase detector module 318 and the combiner 322 via signal path 336. The second power and phase detector module 318 samples part of the combined received signal 354, measures the power amplitude and/or phase of the received signal 354 from the sample, and sends the measured information data to the processor 320 via the second power and phase detector module signal 358 along signal path 342.

The processor 320 receives the output of the power and phase detector module 318 and the output of the first power and phase detector module 316. The processor 320 receives output signal 358 and output signal 356 and adjusts output signal 356 by cancelling out the signal 352 that is output from the amplitude and phase shift module 314 to the combiner 322.

The objective of the processor is to equalize by feedback, both in amplitude and phase, the signals 352 and 354. The processor 320 operates as a feedback adjustment. Signal 358 is a measured signal. However, signal 352 can be adjusted by signal 360. By equalizing and cancelling the two signals coming out of the combiner 322, the transmitter leakage 368 can be cancelled and the system is then left with the received signals 354 that are passed to the receiver 312.

The combiner 322 receives the received signal 354 and combines it with amplitude phase shift module output signal 352 to produce the receiver input signal 364 that is passed to the receiver 312 via signal path 346. The receiver 312 then receives the receiver input signal 364 and produces the receiver output signal 362.

When the transmit input signal 374 is sent along signal path 334 to the receiver 312, the frequency source 308 will act as a local oscillator to the receiver 312 such that the phase noise from the frequency source 308 can be subtracted from the signal 364 so that the receiver output signal 362 can be generated.

Figure 4:
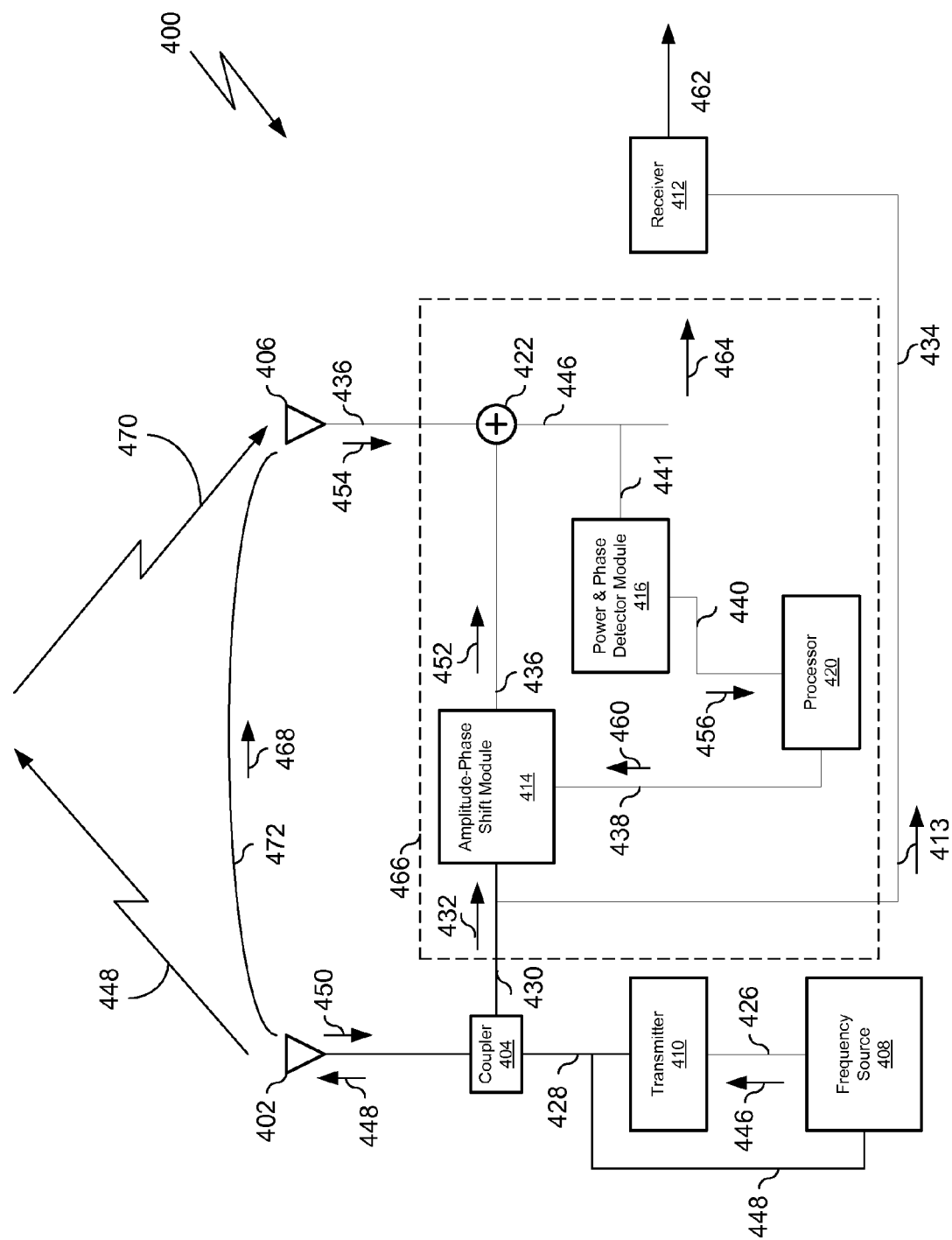
FIG. 4 is a block diagram of an example of an implementation of the wireless transceiver system.

The circuits, components, modules, and/or devices of the high dynamic range transceiver system 400 shown in FIG. 4 are described in signal communication with each other, where the signal communication refers to any type of communication and/or connection between the circuits, components, modules, and/or devices that allows a circuit, component, module, and/or device to pass and/or receive signals and/or information from another circuit, component, module, and/or device.

The communication and/or connection may be along any signal path between the circuits, components, modules, and/or devices that allows signals and/or information to pass from one circuit, component, module, and/or device to another and includes wireless or wired signal paths. The signal paths may be physical pathways such as, for example, conductive wires, electromagnetic wave guides, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

In FIG. 4, a block diagram of an example of an implementation of a transceiver system 400 is shown. The transceiver system 400 includes a first antenna 402, a coupler 404, a second antenna 406, a frequency source 408, a transmitter 410, a receiver 412, an amplitude-phase shift module 414, a power and phase detector module 416, a processor 420, and a combiner 422. The first antenna 402 and second antenna 406 may are capable of transmitting and receiving RF energy of the electromagnetic spectrum.

The first antenna 402 may be connected to a coupler 404 via path 424. The transmitter 410 and the frequency source 408 may be connected via signal path 426. The coupler 404 may be connected to the transmitter 410 via signal path 428. The frequency source 408 may be an oscillator, a temperature controlled oscillator or any other type of frequency generating device. The signal path 428 may also be in signal communication along path 430 such that the bleeded signal 432 is sent to the amplitude-phase shift module 414. The frequency source 408 generates signals to the transmitter 410 and may also be in signal communication with the receiver 412 via signal path 434. The amplitude-phase shift module 414 may be in signal communication with the combiner 422 via signal path 436; and in signal communication with the processor 420 via signal path 438.

The processor 420 also may be in signal communication with the power and phase detector module 416 via signal path 440. The second antenna 406 may be in signal communication with the combiner 422 via signal path 436. The combiner 422 may be in signal communication with the receiver 412 via signal path 446 and the power and phase detector module 416 via signal path 441. Additionally, the first antenna 402 may be in signal communication with the second antenna 406 via signals 468 and 470.

As an example, the first antenna 402 and second antenna 406 may both be RF energy antennas. The frequency reference signal 446 from the frequency source 408, via signal path 426 sent to the transmitter 410, may be used to upconvert and/or modulate a transmit signal 448 that is passed to the first antenna 402 via signal path 424 and a bleeded signal 432 is sent to the amplitude phase shift module 414. In the alternative, the frequency source 408 may generate a signal sent along path 448 bypassing the transmitter 410 and sending the signal along path 448 to the coupler 404. If a first received signal 450 arrives at the first antenna 402, a coupler 404 acts to isolate the received signal 450 so that it is not passed to the transmitter 410 or to the amplitude phase shift module 414.

Receiver 412 is a circuit, component, module, and/or device capable of receiving RF signals through the second antenna 406 and combiner 422. The receiver 412 includes at least one mixer (not shown) that utilizes the bleeded signal 432 from the coupler 404 allowing the receiver 412 to subtract out the phase noise added by the transmitter 410, frequency source 408 or both.

An optional path is for the frequency source 408 to output a signal directly to the receiver 412. Although this optional path would not remove the phase noise generated by the transmitter 410. It is appreciated that while only a receiver is shown in FIG. 4 as receiver 412, the scope of the invention could include utilizing a second transmit/receive module instead of only a receiver.

The frequency source 408 is a circuit, component, module, and/or device capable of producing the frequency reference signal 446. The frequency source 408 may be, for example, a local oscillator or frequency synthesizer both of which are well known by those skilled in the art. The frequency source 408 may include, for example, a voltage controlled oscillator, temperature controlled oscillator, or voltage and temperature controlled oscillator.

The power and phase detector module 416 may be a circuit, component, module, and/or device capable of detecting the power amplitude and/or the phase of an amplitude phase shift module output signal 452 from the amplitude phase shift module 414 and a second received signal 454 from the second antenna 406. The power and phase detector module 416 may include one or more power detector sensor circuits and/or phase detector sensor circuits.

In an example operation, the power and phase detector module 416 would produce a power and phase detector module signal 456 in response to detecting the power and/or phase of the amplitude phase shift module output signal 452. The power and phase detector module 416 may send to the processor analog or digital data on the amplitude and phase of the amplitude phase shift module output signal 452. If analog data is sent an analog-digital converter is needed before the signal is passed to the processor 420.

The power and phase detector module signal 456 may send to the processor analog or digital data on the amplitude and phase of the received signal 454 and second power and phase detector module signal 456 would then include measured power and/or phase information data passed to the processor 420 via signal paths 440. If analog data is sent an analog-digital converter is needed before the signal is passed to the processor 420.

The processor 420 is a circuit, component, module, and/or device capable of receiving the power and phase detector module signal 456 and, in response, generate an amplitude phase shift module control signal 460 that would control the amplitude-phase shift module 414 via signal path 438. The processor 420 is capable of determining how to modify the amplitude and/or phase of the transmit signal 432 with the amplitude phase shift module 414 in order to increase resolution and dynamic range of the receiver output signal 462 based on the measured power and/or phase information data provided by the power and phase detector module signal 456. The processor 420 may be, for example, a central processing unit ("CPU"), microprocessor, microcontroller, controller, digital signal processor ("DSP"), reduced instruction set processor ("RISC processor"), application specific integrated circuit ("ASIC"), or other similar types of devices.

The amplitude-phase shift module 414 is a circuit, component, module, and/or device capable of receiving the amplitude phase shift module control signal 460 and, in response, adjusting the transmit signal 432 in amplitude, phase, or both, to produce the amplitude phase shift module output signal 452 which is passed to the combiner 422 via signal path 436. The combiner 422 may be a circuit, component, module, and/or device capable of combining the amplitude phase shift module output signal 452 with the second received signal 454 to produce the receiver input signal 464. The combiner 422 may be, for example, a summation circuit or coupler.

This sampling and routing of signals acts to cancel via cancellation circuitry 466 the transmitter leakage of received signals 468 and signal 470. Thus, the system is designed to cancel the transmitter leakage from signal 468 leaving only the received signals 470. It is this modified signal 464 that is passed to the receiver 412 and then onto the communication system via signal path 462 for output to a user.

The transceiver system 400 produces the RF energy when the frequency transmit signals 448 are generated. The input signal 432 may be externally generated, preprogrammed or generated by the transmitter 410. The output signal 448 is passed to the first antenna 402 via signal path 428. The first antenna 402 transmits the transmit output signal 448 towards the medium of the communication channel, which could be air. A portion 468 of the transmitted output signal 448 may be directly coupled to the second antenna 406 via signal path 472.

A portion 432 of the transmitted output signal 448 captured via a coupler 404 or any similar device is fed to the cancellation system, where its amplitude and phase are going to be adjusted to accurately perform cancellation. Ideally, the coupler 404 acts to allow transmission of output signals, but does not pass received signals 450 to other circuitry such as the amplitude phase shift module 414.

Based on the amplitude phase shift module control input signal 460, the amplitude-phase shift module 414 adjusts the received transmit signal 432 in phase and/or amplitude to produce the amplitude phase shift module output signal 452, which is passed to the power and phase detector module 416 and combiner 422. The power and phase detector module 416 samples part of the amplitude phase shift module output signal 452 and measures the power amplitude and/or phase of the amplitude phase shift module output signal 452 and sends the measured information to the processor 420 via the power and phase detector module signal 456 along signal path 440.

The second antenna 406 receives the leakage signal 468 of the transmitted output signal 448 and passes the combined received signal (transmit signal plus leakage) 454 to the combiner 422 via signal path 436. The power and phase detector module 416 samples part of the combined received signal 454, measures the power amplitude and/or phase of the received signal 454 from the sample, and sends the measured information data to the processor 420 via the power and phase detector module signal 456 along signal path 440.

The processor 420 receives output signal 456 and adjusts output signal 460 by cancelling out the signal 452 that is output from the amplitude and phase shift module 414 that is sent to the combiner 422.

The objective of the processor is to equalize by feedback signal 456. The processor 420 operates as a feedback adjustment. However, signal 452 can be adjusted by signal 460. By equalizing and cancelling the two signals coming out of the combiner 422, the transmitter leakage 468 can be cancelled and the system is then left with the received signals 354 that are passed to the receiver 412.

The combiner 422 receives the received signal 454 and combines it with amplitude phase shift module output signal 452 to produce the receiver input signal 464 that is passed to the receiver 412 via signal path 446. The receiver 412 then receives the receiver input signal 464 and produces the receiver output signal 462.

When the transmit input signal 474 is sent along signal path 434 to the receiver 412, the frequency source 408 will act as a local oscillator to the receiver 412 such that the phase noise from the frequency source 408 can be subtracted from the signal 464 so that the receiver output signal 462 can be generated.

Figure 5:
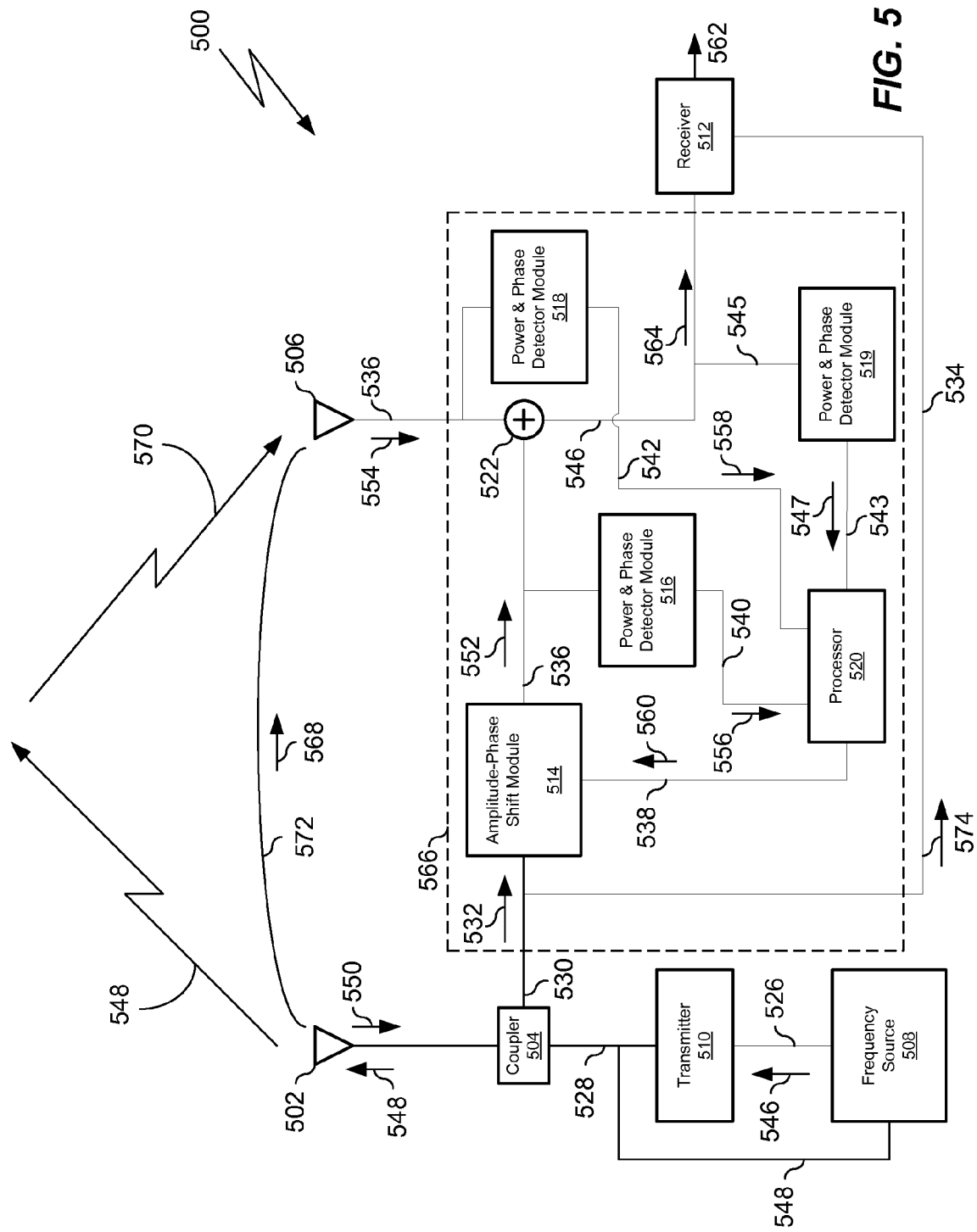
FIG. 5 is a block diagram of an example of an implementation of the wireless transceiver system.

The circuits, components, modules, and/or devices of the high dynamic range transceiver system 500 shown in FIG. 5 are described in signal communication with each other, where the signal communication refers to any type of communication and/or connection between the circuits, components, modules, and/or devices that allows a circuit, component, module, and/or device to pass and/or receive signals and/or information from another circuit, component, module, and/or device.

The communication and/or connection may be along any signal path between the circuits, components, modules, and/or devices that allows signals and/or information to pass from one circuit, component, module, and/or device to another and includes wireless or wired signal paths. The signal paths may be physical pathways such as, for example, conductive wires, electromagnetic wave guides, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

In FIG. 5, a block diagram of an example of an implementation of a transceiver system 500 is shown. The transceiver system 500 includes a first antenna 502, a coupler 504, a second antenna 506, a frequency source 508, a transmitter 510, a receiver 512, an amplitude-phase shift module 514, a first power and phase detector module 516, a second power and phase detector module 518, a third power and phase detector module 519, a processor 520, and a combiner 522. The first antenna 502 and second antenna 506 may are capable of transmitting and receiving RF energy of the electromagnetic spectrum.

The first antenna 502 may be connected to a coupler 504 via path 524. The transmitter 510 and the frequency source 508 may be connected via signal path 526. The coupler 504 may be connected to the transmitter 510 via signal path 528. The frequency source 508 may be an oscillator, a temperature controlled oscillator or any other type of frequency generating device. The signal path 528 may also be in signal communication along path 530 such that the bleeded signal 532 is sent to the amplitude-phase shift module 514. The frequency source 508 generates signals to the transmitter 510 and may also be in signal communication with the receiver 512 via signal path 534. The amplitude-phase shift module 514 may be in signal communication with the first power and phase detector module 516 and combiner 522 via signal path 536; and in signal communication with the processor 520 via signal path 538.

The processor 520 also may be in signal communication with the first power and phase detector module 516 via signal path 540; in signal communication with the second power and phase detector module 518 via signal path 542; and in signal communication with the third power and phase detector module 519 via signal path 543. The second antenna 506 may be in signal communication with both the combiner 522 via signal path 536; and the third power and phase detector module 519 via signal path 546 and 545. The combiner 522 may be in signal communication with the receiver 512 via signal path 546. Additionally, the first antenna 502 may be in signal communication with the second antenna 506 via signals 568 and 570.

As an example, the first antenna 502 and second antenna 506 may both be RF energy antennas. The frequency reference signal 546 from the frequency source 508, via signal path 526 sent to the transmitter 510, may be used to upconvert and/or modulate a transmit signal 548 that is passed to the first antenna 502 via signal path 524 and a bleeded signal 532 is sent to the amplitude phase shift module 514. In the alternative, the frequency source 508 may generate a signal sent along path 548 bypassing the transmitter 510 and sending the signal along path 548 to the coupler 504. If a first received signal 550 arrives at the first antenna 502, a coupler 504 acts to isolate the received signal 550 so that it is not passed to the transmitter 510 or to the amplitude phase shift module 514.

Receiver 512 is a circuit, component, module, and/or device capable of receiving RF signals through the second antenna 506 and combiner 522. The receiver 512 includes at least one mixer (not shown) that utilizes the bleeded signal 532 from the coupler 504 allowing the receiver 512 to subtract out the phase noise added by the transmitter 510, frequency source 508 or both.

An optional path is for the frequency source 508 to output a signal directly to the receiver 512. Although this optional path would not remove the phase noise generated by the transmitter 510. It is appreciated that while only a receiver is shown in FIG. 5 as receiver 512, the scope of the invention could include utilizing a second transmit/receive module instead of only a receiver.

The frequency source 508 is a circuit, component, module, and/or device capable of producing the frequency reference signal 546. The frequency source 508 may be, for example, a local oscillator or frequency synthesizer both of which are well known by those skilled in the art. The frequency source 508 may include, for example, a voltage controlled oscillator, temperature controlled oscillator, or voltage and temperature controlled oscillator.

Each of the first power and phase detector module 516 and second power and phase detector module 518 may be a circuit, component, module, and/or device capable of detecting the power amplitude and/or the phase of an amplitude phase shift module output signal 552 from the amplitude phase shift module 514 and a second received signal 554 from the second antenna 506. Both the first power and phase detector module 516 and the second power and phase detector module 518 may include one or more power detector sensor circuits and/or phase detector sensor circuits.

In an example operation, the first power and phase detector module 516 would produce a first power and phase detector module signal 556 in response to detecting the power and/or phase of the amplitude phase shift module output signal 552. The first power and phase detector module 516 may send to the processor analog or digital data on the amplitude and phase of the amplitude phase shift module output signal 552. If analog data is sent an analog-digital converter is needed before the signal is passed to the processor 520.

Similarly, the second power and phase detector module 518 produces a second power and phase detector module signal 556 in response to detecting the power and/or phase of the second received signal 554. The first power and phase detector module signal 556 may send to the processor analog or digital data on the amplitude and phase of the received signal 554 and second power and phase detector module signal 556 would then include measured power and/or phase information data passed to the processor 520 via signal paths 540 and 542, respectively. If analog data is sent an analog-digital converter is needed before the signal is passed to the processor 520.

The processor 520 is a circuit, component, module, and/or device capable of receiving the first power and phase detector module signal 556 and second power and phase detector module signal 558 and, in response, generate an amplitude phase shift module control signal 560 that would control the amplitude-phase shift module 514 via signal path 538. The processor 520 is capable of determining how to modify the amplitude and/or phase of the transmit signal 532 with the amplitude phase shift module 514 in order to increase resolution and dynamic range of the receiver output signal 562 based on the measured power and/or phase information data provided by the first power and phase detector module signal 556 and second power and phase detector module signal 558. The processor 520 may be, for example, a central processing unit ("CPU"), microprocessor, microcontroller, controller, digital signal processor ("DSP"), reduced instruction set processor ("RISC processor"), application specific integrated circuit ("ASIC"), or other similar types of devices.

The amplitude-phase shift module 514 is a circuit, component, module, and/or device capable of receiving the amplitude phase shift module control signal 560 and, in response, adjusting the transmit signal 532 in amplitude, phase, or both, to produce the amplitude phase shift module output signal 552 which is passed to the combiner 522 via signal path 536. The combiner 522 may be a circuit, component, module, and/or device capable of combining the amplitude phase shift module output signal 552 with the second received signal 554 to produce the receiver input signal 564. The combiner 522 may be, for example, a summation circuit or coupler.

This sampling and routing of signals acts to cancel via cancellation circuitry 566 the transmitter leakage of received signals 568 and signal 570. Thus, the system is designed to cancel the transmitter leakage from signal 568 leaving only the received signals 570. It is this modified signal 564 that is passed to the receiver 512 and then onto the communication system via signal path 562 for output to a user.

The transceiver system 500 produces the RF energy when the frequency transmit signals 548 are generated. The input signal 532 may be externally generated, preprogrammed or generated by the transmitter 510. The output signal 548 is passed to the first antenna 502 via signal path 528. The first antenna 502 transmits the transmit output signal 548 towards the medium of the communication channel, which could be air. A portion 568 of the transmitted output signal 548 may be directly coupled to the second antenna 506 via signal path 572.

A portion 532 of the transmitted output signal 548 captured via a coupler 404 or any similar device is fed to the cancellation system, where its amplitude and phase are going to be adjusted to accurately perform cancellation. Ideally, the coupler 504 acts to allow transmission of output signals, but does not pass received signals 550 to other circuitry such as the amplitude phase shift module 514.

Based on the amplitude phase shift module control input signal 560, the amplitude-phase shift module 514 adjusts the received transmit signal 532 in phase and/or amplitude to produce the amplitude phase shift module output signal 552, which is passed to the first power and phase detector module 516 and combiner 522. The first power and phase detector module 516 samples part of the amplitude phase shift module output signal 552 and measures the power amplitude and/or phase of the amplitude phase shift module output signal 552 and sends the measured information to the processor 420 via the first power and phase detector module signal 556 along signal path 540.

The second antenna 506 receives the leakage signal 568 of the transmitted transmit output signal 548 and passes the combined received signal 570 to both the second power and phase detector module 518 and the combiner 522 via signal path 536. The second power and phase detector module 518 samples part of the combined received signal 554, measures the power amplitude and/or phase of the received signal 554 from the sample, and sends the measured information data to the processor 520 via the second power and phase detector module signal 558 along signal path 542.

The processor 520 receives the output of the power and phase detector module 518 and the output of the first power and phase detector module 516. The processor 520 receives output signal 558 and output signal 556 and adjusts output signal 556 by cancelling out the signal 552 that is output from the amplitude and phase shift module 514 to the combiner 522.

The objective of the processor is to equalize by feedback signals 556 and 558. The processor 520 operates as a feedback adjustment. Signal 558 is a measured signal. However, signal 552 can be adjusted by signal 560. By equalizing and cancelling the two signals coming out of the combiner 522, the transmitter leakage 568 can be cancelled and the system is then left with the received signals 554 that are passed to the receiver 512.

The combiner 522 receives the received signal 554 and combines it with amplitude phase shift module output signal 552 to produce the receiver input signal 564 that is passed to the receiver 512 via signal path 546. The receiver 512 then receives the receiver input signal 564 and produces the receiver output signal 562.

When the transmit input signal 574 is sent along signal path 534 to the receiver 512, the frequency source 508 will act as a local oscillator to the receiver 512 such that the phase noise from the frequency source 508 can be subtracted from the signal 564 so that the receiver output signal 562 can be generated.

Figure 6:
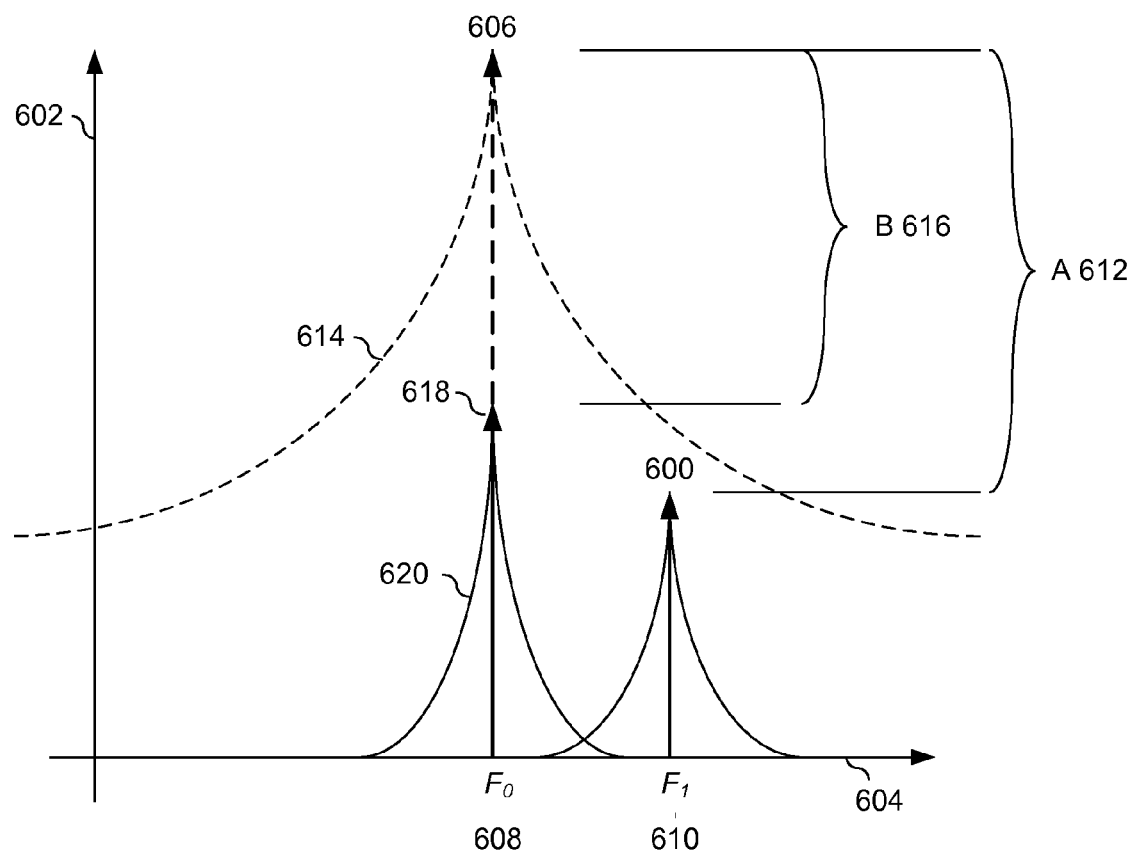
FIG. 6 is a plot of a receiver input signal after cancellation produced by the wireless transceiver system shown in FIG. 3, 4 or 5.

In FIG. 6, a plot of an example of a received signal 600 as a function of amplitude 602 versus frequency 604 is shown. The received signal 600 is an example of the received signals 370, 470 and 570 as shown in FIGS. 3-5. The received signal 600 may include transmitter leakage 606, at frequency $F_0$ 608 (which would be the frequency of the frequency sources 308, 408 and 508), and received signals 600 at frequency $F_1$ 610.

The difference in amplitude intensity between the transmitter leakage 606 and the received signal 600 is shown as A 612. As an example, the difference between the transmit leakage 606 and the received signal 600 which may be initially about 90 dB to 130 dB, which would again effectively place the received signal 600 below the skirts 614. Additionally, because of jitter effects caused by the characteristics of both the frequency sources, the transmitter leakage 606 may initially have a skirt 614 that effectively covers the received signal 600.

However, once the cancellation is performed both the transmit leakage and its skirts 614 by the cancellation amount B 616 so that the transmit leakage is reduced to a new transmit leakage 618. Thus, the received signal 600 is now above the new skirts 620 associated with the new transmit leakage 618.

The reduction of the transmit leakage 606 is caused by the compensation and canceling effects of combining the amplitude phase shift module output signal 352 with the received signal 370 (when compared to the embodiment in FIG. 3). As stated above, the processor 320, based on the measured values of the first power and phase detector module signal 356 and second power and phase detector module signal 358, determines how best to modify the transmit signal 332 to create the amplitude phase shift module output signal 352 so as to cancel out the transmit leakage 368 when the amplitude phase shift module output signal 352 is combined with the received signal 354. Additionally, the transmit leakage 368 may be reduced further in this approach because the transceiver system 300 utilizes a signal frequency source 308 as a frequency reference to the receiver 312 via path 334, which greatly reduces the frequency uncertainty associated with the system compared to known approaches.

Figure 7:
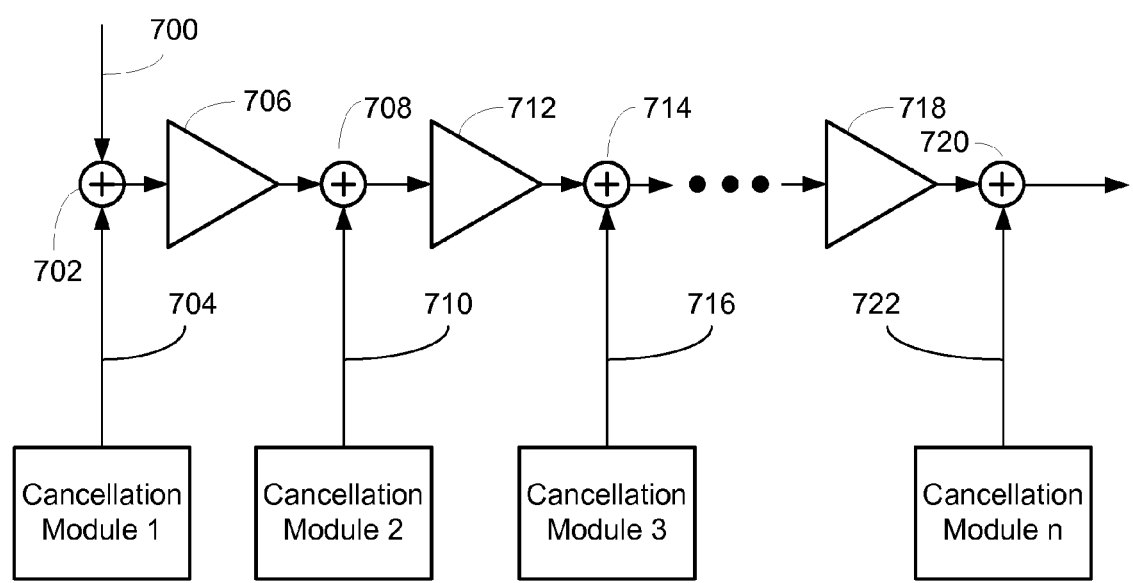
FIG. 7 is a block diagram illustrating the input of multiple cancellation modules.

To achieve a higher dynamic range, more cancellation is needed. Here, the problem is solved by using a cancellation scheme providing a wide dynamic range exceeding 150 dB. FIG. 7 illustrates a cascading of the cancellation modules applying the cancellation scheme repeating the cancellation scheme. Each cancellation circuit could be limited to only 20-30 dB of rejection due to component mismatches and other circuit non-idealities. To obtain further cancellation, another cancellation circuit can be applied after the first low noise amplifier. Then the same can be done after the second low noise amplifier. Theoretically, there is no limit to the number of cancellation circuits that could be used in one chain.

FIG. 7 illustrates such a cascading effect. The received signal 700 is combined 702 with a first cancellation signal 704 and the combined signal is passed to a low noise amplifier 706. The output of the low noise amplifier 706 can be combined 708 the second cancellation signal 710. The combined signal 708 is passed to a second low noise amplifier 712. The output of the low noise amplifier 712 can be combined 714 with the third cancellation signal 716. The output of the low noise amplifier 712 can be repeatedly combined with additional cancellation signals "n" number of times such that the "n" low noise amplifier 718 is combined 720 with the "n" cancellation signal 722. For each additional cancellation signal may add a 20-50 dB reduction in noise may be achieved such that cascading three or four cancellation signals from cancellation modules may produce a 150 dB gain.

Figure 8:
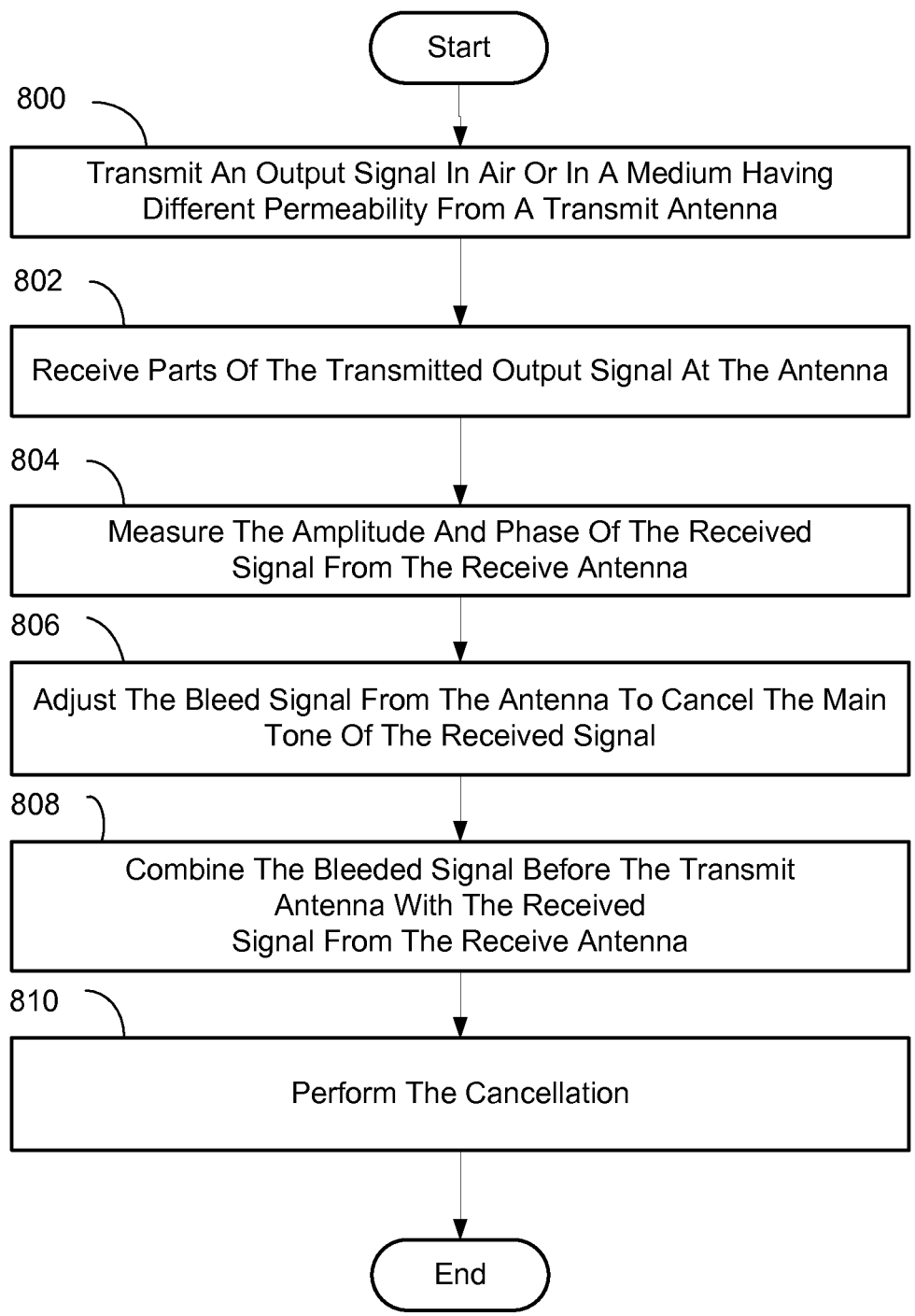
FIG. 8 is a flowchart illustrating the process performed by the operation of the wireless transceiver system.

FIG. 8 illustrates the cancellation process set forth in FIG. 7 and performed by the operation of the transceiver system as shown in FIG. 3, 4 or 5. The process begins when the transceiver system transmits an output signal at air and a medium with another permittivity from a transmit antenna 800. The antenna receives a portion of the receive output signal 802 and the receive antenna as described in circuitry of FIG. 3, 4 or 5. The power and phase detector module then measures the amplitude and/or phase of the received signal (for example, as shown as the received signal 358 in FIG. 3) from the receive antenna 804. The amplitude phase shift module then adjusts the received signal from the receive antenna to cancel (or reduce the amplitude of) the transmit leakage within the received signal from the antenna. The amplitude phase shift module adjusts the bleeded signal 806 based on the amplitude phase shift module control signal from the processor, where the processor receives measurement information from the first power and phase detector module and second power and phase detector module. The process 808 then combines the bleeded signal before the transmitter antenna with the received signal from the receive antenna. The cancellation is then performed 810. The cancellation is repeated as shown in FIG. 7 until the desired number of iterations is reached.

While various embodiments of the invention have been described, it will be apparent to those of ordinary skill in the art that many more embodiments and implementations are possible that are within the scope of this invention.

What is claimed is:

1. A communication system, comprising:
a transmitter connected to a first antenna;
an amplitude phase shift module having a first input connected to the transmitter, a second input connected to a processor and an output connected to a combiner;
a receiver connected to the combiner;
a first power and phase detector module, connected to the output of the amplitude phase shift module, that samples the output of the amplitude phase shift module in order to generate a first set of phase and amplitude data and sending the first phase and amplitude data to the processor; and
a second power and phase detector module connected to the processor and a second antenna where the second power and phase detector module that samples received signals from the second antenna in order to generate a second set of phase and amplitude data and sending the second set of phase and amplitude data to the processor for generating and sending an adjustment feedback signal to the amplitude phase shift module enabling the amplitude phase shift detector to modify its output to the combiner such that the receiver gets the received signals without transmit leakage.

2. The communication system of claim 1, further including a frequency source connected to the transmitter.

3. The communication system of claim 2, where the frequency source is an oscillator.

4. The communication system of claim 2, where the frequency source is a temperature controlled oscillator.

5. The communication system of claim 1, where the first set of phase and amplitude data comprises analog signals.

6. The communication system of claim 1, where the first set of phase and amplitude data comprises digital data.

7. The communication system of claim 1, where the second set of phase and amplitude data comprises analog signals.

8. The communication system of claim 1, where the second set of phase and amplitude data comprises digital signals.

9. The communication system of claim 1, where the first antenna is a RF antenna.

10. The communication system of claim 1, where the second antenna is a RF antenna.

11. A communication system, comprising:
a transmitting antenna and a receiving antenna;
an amplitude phase shift module connected to the transmitting antenna, a processor and the receiving antenna;
a first power and phase detector connected to an output on the amplitude phase shift module and to an input on the processor;
a second power and phase detector module connected to the receiving antenna and the input on the processor; and
a receiver connected to the output of the amplitude phase shift module and the receiving antenna such that received signals from the second antenna, when combined with the output from the amplitude phase shift module, produces an input signal to the receiver comprising received signals, but no transmit leakage.

12. The communication system of claim 11, where the amplitude phase shift module modifies its output signal based on the input of a transmitted signal from the transmitting antenna and the received signal from the receiving antenna.

13. The communication system of claim 12, where the modified output signal removes transmit leakage of the received signal.

14. The communication system of claim 12, where the first and second power and phase detectors measures and sends to the processor output data regarding the transmitted and received signals respectively.

15. The communication system of claim 14, where the processor uses the output data from the first and second power and phase detectors to generate a modification signal that is sent by the processor to the amplitude phase shift module.

16. The communication system of claim 15, where the amplitude phase shift module modifies the transmitted signal such that the output signal from the amplitude phase shift module when combined with the received signal produces a signal comprising received signals without transmit leakage.

17. A communication system, comprising:
transmitting signals from a transmitting antenna;
receiving signals by a receiving antenna;
measuring the amplitude and phase of the received signals;
generating bleeded signals from the transmitting antenna;
performing a cancellation process on the bleeded signals using the amplitude and phase of the received signals to remove transmit leakage of the received signals;
creating an output signal from the removal of the transmit leakage of the received signals;
transmitting the output signal to a receiver
measuring the amplitude and phase of the received signals thus creating amplitude and phase data from the received signals;
measuring the amplitude and phase of the bleeded signals thus creating amplitude and phase data from the bleeded signals;
processing the measured amplitude and phase data from the received and bleeded signals by a processor thus creating adjustment data;
modifying the bleeded signals by the adjustment data so that transmit leakage of the received signals are removed; and
combining the modified bleeded signals with the received signals.

\* \* \* \* \*